United States Patent
Liang et al.

(10) Patent No.: US 8,837,147 B2
(45) Date of Patent: Sep. 16, 2014

(54) ELECTRONIC DEVICE WITH A BATTERY FASTENING MECHANISM

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, New Taipei (TW)

(*) Notice: Subject to any disclaimer, the term of this patent is extended or adjusted under 35 U.S.C. 154(b) by 195 days.

(21) Appl. No.: 13/612,892

(22) Filed: Sep. 13, 2012

(65) Prior Publication Data

US 2013/0093305 A1  Apr. 18, 2013

(30) Foreign Application Priority Data

Oct. 13, 2011  (TW) .............................. 100137138 A

(51) Int. Cl.
- G06F 1/16 (2006.01)
- H05K 5/00 (2006.01)
- H05K 7/00 (2006.01)
- H01M 2/10 (2006.01)

(52) U.S. Cl.
CPC ................ *G06F 1/16* (2013.01); *G06F 1/1635* (2013.01); *G06F 1/1616* (2013.01); *H01M 2/10* (2013.01)
USPC .................................. 361/679.58; 361/679.01

(58) Field of Classification Search
CPC ....... G01S 19/235; G06F 1/1616; G06F 1/16; G06F 1/1635; H01M 2/10
USPC .......... 361/747, 679.58, 679.01; 429/96, 100; 320/107, 112; 292/28, 125, 141, 171, 292/292, 295, 225
See application file for complete search history.

(56) References Cited

U.S. PATENT DOCUMENTS

| | | | | |
|---|---|---|---|---|
| 6,159,632 A * | 12/2000 | Osawa | ........................ | 429/100 |
| 7,161,800 B2 * | 1/2007 | Tanaka et al. | ............ | 361/679.57 |
| 7,630,742 B2 * | 12/2009 | Park et al. | .................. | 455/575.1 |
| 8,264,826 B2 * | 9/2012 | Tobiyama et al. | ....... | 361/679.02 |
| 8,287,009 B2 * | 10/2012 | Dane et al. | ....................... | 292/56 |
| 8,349,480 B1 * | 1/2013 | Chiang et al. | ................ | 429/100 |
| 8,379,385 B2 * | 2/2013 | Miyagi et al. | ............ | 361/679.58 |
| 8,724,318 B2 * | 5/2014 | Liang et al. | .............. | 361/679.58 |

(Continued)

FOREIGN PATENT DOCUMENTS

| TW | M326229 | 1/2008 |
|---|---|---|
| TW | M411000 | 9/2011 |

OTHER PUBLICATIONS

Office Action issued in Taiwanese Patent Application No. 100137138 dated Oct. 17, 2013 (with translation).

*Primary Examiner* — Lisa Lea Edmonds
*Assistant Examiner* — Keith Depew
(74) *Attorney, Agent, or Firm* — Nixon & Vanderhye P.C.

(57) ABSTRACT

An electronic device includes a battery module, a housing having first and second panels, and a fastening mechanism. The fastening mechanism has a fixing portion extending from the battery module and engaging an opening in the first panel, a first fastening portion formed in the fixing portion, a cantilever formed in the second panel, and a second fastening portion formed on the cantilever and engaging the first fastening portion. The cantilever can be bent away from the fixing portion, such that the second fastening portion is disengaged from the first fastening portion, and that the fixing portion is urged by a protrusion on the cantilever to be disengaged from the opening.

11 Claims, 8 Drawing Sheets

(56) References Cited

U.S. PATENT DOCUMENTS

| | | | |
|---|---|---|---|
| 2004/0012209 A1* | 1/2004 | Liu et al. | 292/141 |
| 2007/0091556 A1* | 4/2007 | Wu | 361/683 |
| 2007/0097614 A1* | 5/2007 | Hsiao et al. | 361/683 |
| 2007/0206352 A1* | 9/2007 | Lee | 361/686 |
| 2009/0059482 A1* | 3/2009 | Hsu et al. | 361/679 |
| 2012/0268900 A1 | 10/2012 | Fan et al. | |
| 2012/0307428 A1* | 12/2012 | Liang et al. | 361/679.01 |
| 2013/0093305 A1* | 4/2013 | Liang et al. | 312/319.1 |

\* cited by examiner

ELECTRONIC DEVICE WITH A BATTERY FASTENING MECHANISM

CROSS-REFERENCE TO RELATED APPLICATION

This application claims priority of Taiwanese Patent Application No 100137138, filed on Oct. 13, 2011, the entire disclosure of which is incorporated herein by reference.

BACKGROUND OF THE DISCLOSURE

1. Field of the Disclosure

The disclosure relates to an electronic device, and more particularly to an electronic device with a battery fastening mechanism.

2. Description of the Related Art

A conventional battery fastening mechanism for an electronic device, such as a notebook computer, as shown in FIG. 1, mostly utilizes a spring 11 and a fastening member 12 to fasten or release its battery module (not shown). During installation of the battery module in a main body of the notebook computer, the battery module forces the fastening member 12 to be displaced horizontally, while the spring 11 is stretched. After the installation of the battery module, a restoring force of the spring 11 moves the fastening member 12 to its original position, thereby positioning the battery module relative to the main body. When it is desired to remove the battery module, the fastening member 12 is moved horizontally to be separated from the battery module and thus eject out the battery module, so that the battery module may be removed from the main body.

However, the spring 11 and the fastening member 12 are parts separate from the battery module and the main body of the notebook computer. That is to say, additional parts are required in the abovementioned prior art in order to install and remove the battery module quickly and conveniently.

SUMMARY OF THE DISCLOSURE

Therefore, an object of the present disclosure is to provide an electronic device with a battery fastening mechanism, which is directly formed on a battery module and a housing of the electronic device without use of any additional parts.

Accordingly, an electronic device of the present disclosure comprises a battery module, a housing and at least one fastening mechanism. The battery module has a coupling surface. The housing has a first panel that is parallel to the coupling surface and that is formed with at least one opening, and a second panel that extends inwardly and perpendicularly from the first panel. The at least one fastening mechanism has a fixing portion, a first fastening portion, a cantilever, a second fastening portion and a protrusion. The fixing portion extends from the coupling surface of the battery module and engages removably the at least one opening. The first fastening portion is disposed on the fixing portion.

The cantilever is flexible, is formed in the second panel, and has a free end segment proximate to the first panel, a first surface adjacent to the fixing portion, and a second surface opposite to the first surface. The second fastening portion is disposed on the first surface, is adjacent to the free end segment, and engages removably the first fastening portion. The protrusion is formed on the first surface and is adjacent to the fixed end segment.

The free end segment of the cantilever is urged by the fixing portion to bend away from the fixing portion during movement of the fixing portion from a disengaged position toward an engaged position via the at least one opening, and restores to engage the second fastening portion with the first fastening portion when the fixing portion is moved to the engaged position. The free end segment of the cantilever is operable to bend away from the fixing portion, such that the second fastening portion is disengaged from the first fastening portion, and that the fixing portion is urged by the protrusion to move from the engaged position to the disengaged position to be disengaged from the at least one opening.

BRIEF DESCRIPTION OF THE DRAWINGS

Other features and advantages of the present disclosure will become apparent in the following detailed description of one embodiment with reference to the accompanying drawings, of which.

DETAILED DESCRIPTION OF THE EMBODIMENT

Figure 1:
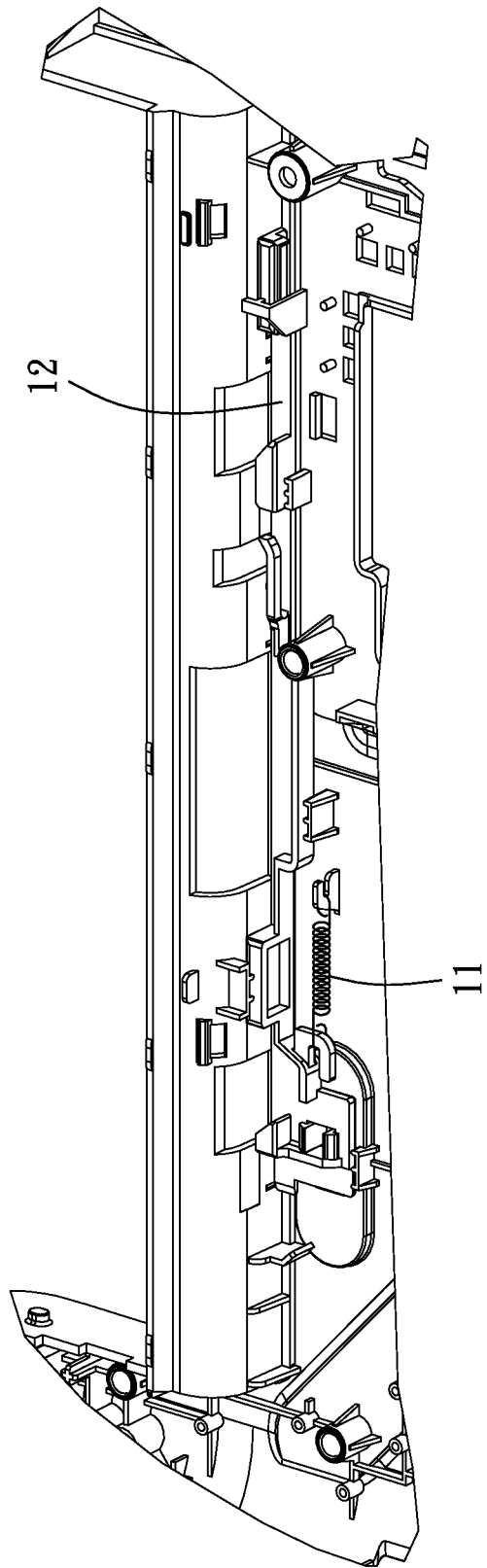
FIG. 1 is a fragmentary perspective view of a conventional battery fastening mechanism of an electronic device.
Figure 2:
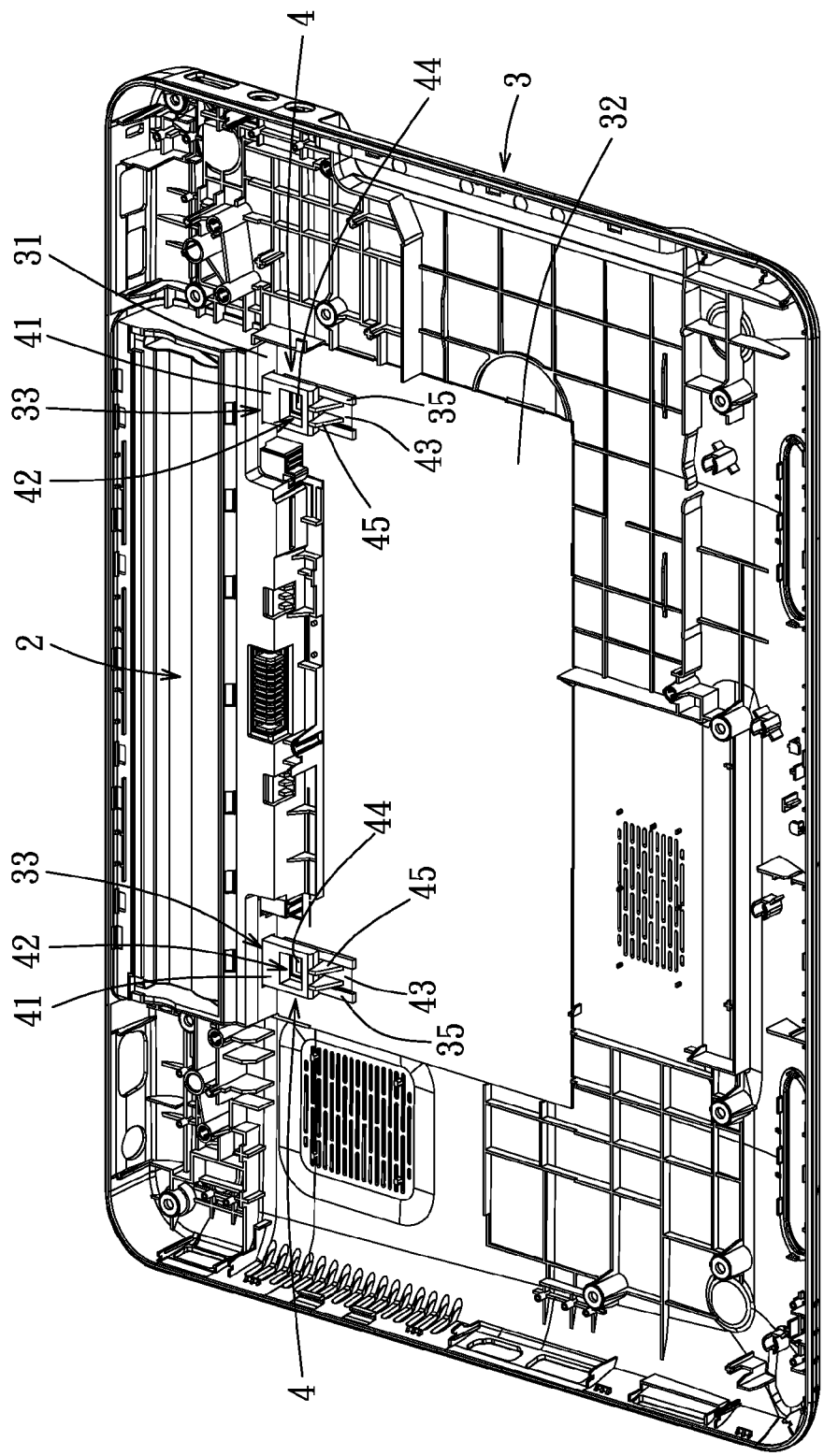
FIG. 2 is a fragmentary perspective view of an embodiment of an electronic device with a battery fastening mechanism according to the present disclosure.
Figure 3:
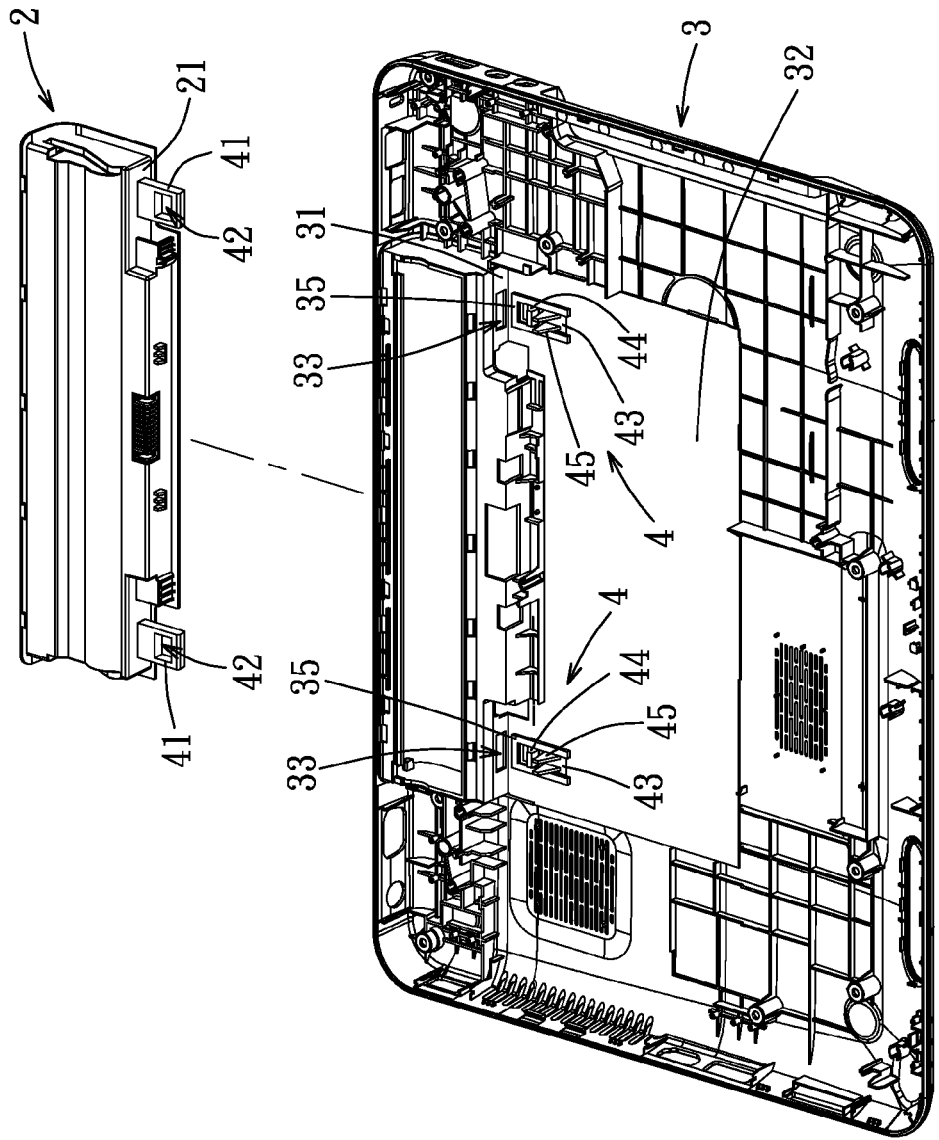
FIG. 3 is a fragmentary exploded perspective view of the embodiment of the present disclosure.
Figure 4:
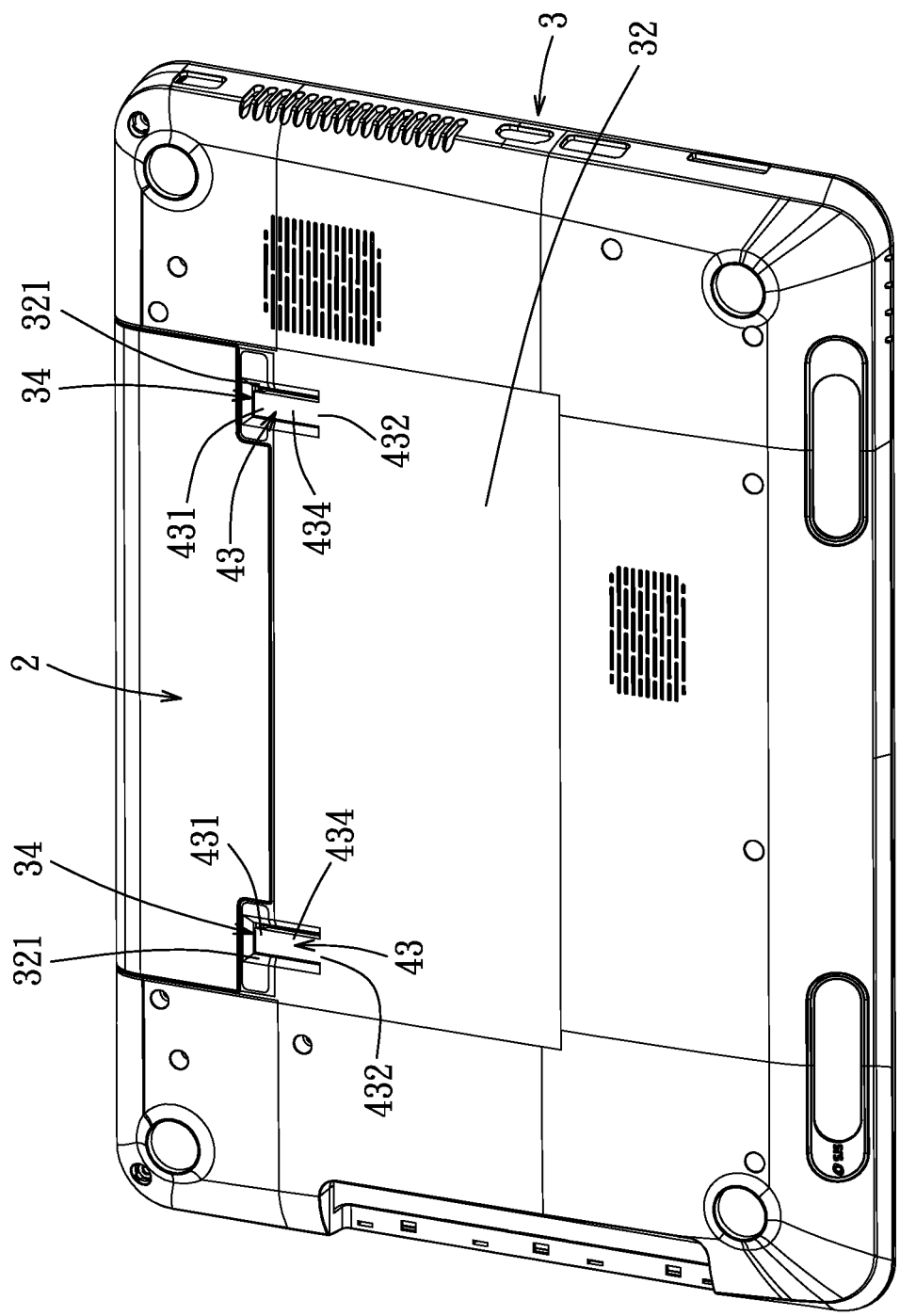
FIG. 4 is a perspective view of the embodiment of the present disclosure.

Referring to FIGS. 2, 3 and 4, an embodiment of an electronic device of the present disclosure is exemplified as a notebook computer, and comprises a battery module 2, a housing 3 and two fastening mechanisms 4. The battery module 2 has a coupling surface 21. The housing 3 includes a first panel 31 parallel to the coupling surface 21 and formed with two openings 33 that are spaced apart from each other, and a second panel 32 extending inwardly and perpendicularly from the first panel 31. Each of the fastening mechanisms 4 has a fixing portion 41 extending from the coupling surface 21 of the battery module 2, a first fastening portion 42 disposed on the fixing portion 41, and a cantilever 43 formed in the second panel 32. In this embodiment, the cantilever 43 and the second panel 32 are molded integrally as one piece, and the fixing portion 41 and the battery module 2 are also molded as one piece. The number of the battery fastening mechanisms 4 may vary, such that their positions on the battery module 2 and the housing 3 and the number and positions of the openings 33 may change accordingly.

Figure 9:
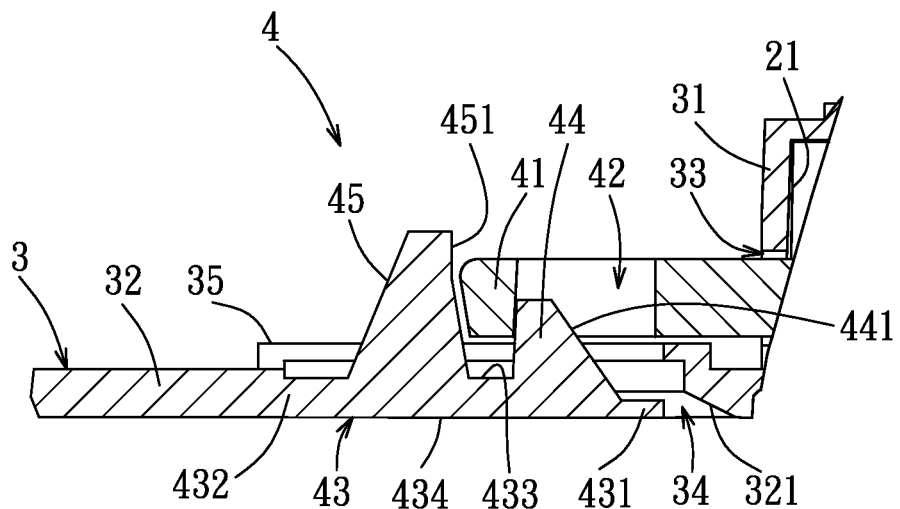
FIG. 9 is still another sectional view of the fastening mechanism of the embodiment, illustrating that the fixing portion is at the engaged position, and the second fastening portion is engaged with a first fastening portion.
Figure 10:
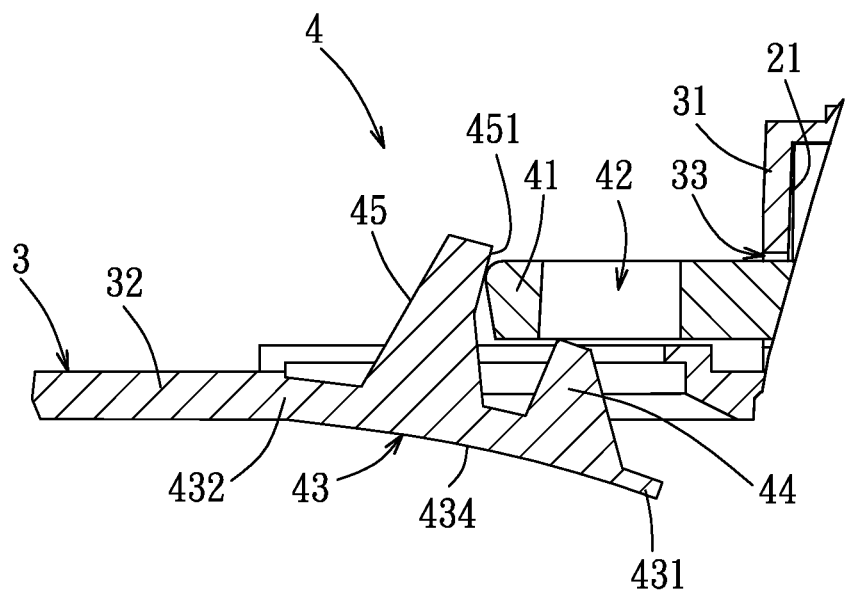
FIG. 10 is still another sectional view of the fastening mechanism of the embodiment illustrating that the cantilever is bent away from the fixing portion and a protrusion pushes the fixing portion to move toward the disengaged position.

Referring to FIGS. 9 and 10, each of the fixing portions 41 extends removably through corresponding respective one of the openings 33. The first fastening portion 42 in this embodiment is a through hole extending through the fixing portion 41. Each of the cantilevers 43 has a free end segment 431 proximate to the first panel 31, a fixed end segment 432 distal from the first panel 31, a first surface 433 adjacent to the fixing portion 41, and a second surface 434 opposite to the first surface 433. The cantilevers 43 are flexible, and the free end segment 431 of each of the cantilevers 43 has a thickness smaller than that of the fixed end segment 432 of a corresponding one of the cantilevers 43. Alternatively, the thickness of the free end segment 431 of each cantilever 43 may be equal to that of the fixed end segment 432 of the corresponding one of the cantilevers 43.

As shown in FIGS. 9 and 10, each of the fastening mechanisms 4 further has a second fastening portion 44 and a protrusion 45 that are formed on the first surface 433. The second fastening portion 44 and the protrusion 45 are spaced apart from each other, where the second fastening portion 44 is adjacent to the free end segment 431, and the protrusion 45 is adjacent to the fixed end segment 432. In this embodiment, the second fastening portion 44 of each fastening mechanism 4 is a projection having an inclined guiding surface 441 that faces a corresponding one of the openings 33, cooperates with the free end segment 431 of the corresponding cantilever 43 to form a hook structure, and engages removably a corresponding first fastening portion 42.

As shown in FIGS. 9 and 10, the protrusion 45 of each fastening mechanism 4 has an abutment surface 451 facing a corresponding second fastening portion 44, and abuts against the corresponding fixing portion 41 when the free end segment 431 of the corresponding cantilever 43 is bent away from the corresponding fixing portion 41. The abutment surface 451 of each protrusion 45 may be a plane surface, a convex surface or a concave surface as long as the abutment surface 451 of each protrusion 45 can abut against the corresponding fixing portion 41 when the free end segment 431 of the corresponding cantilever 43 is bent and the engagement between the first fastening portion 42 and the corresponding second fastening portion 44 is not affected by the abutment surface 451.

Figure 5:
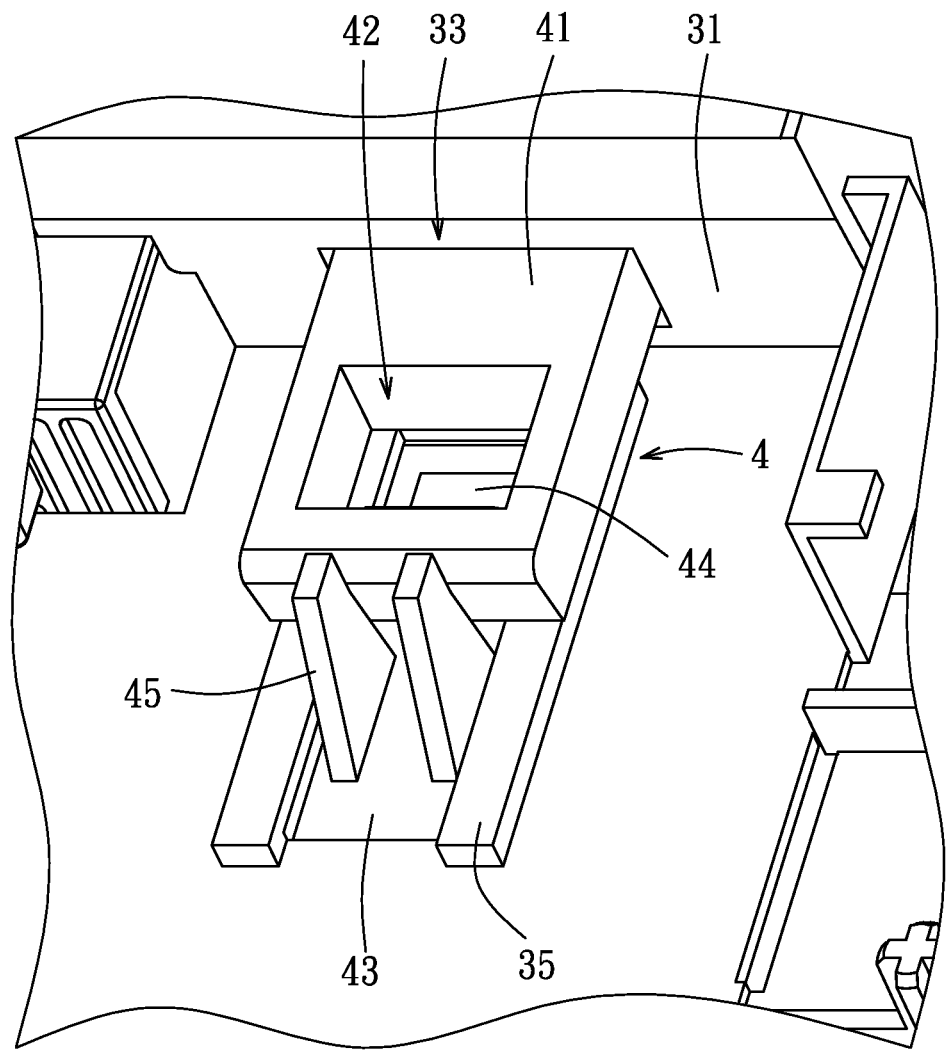
FIG. 5 is an enlarged fragmentary perspective view of a fastening mechanism of the embodiment of the present disclosure.
Figure 6:
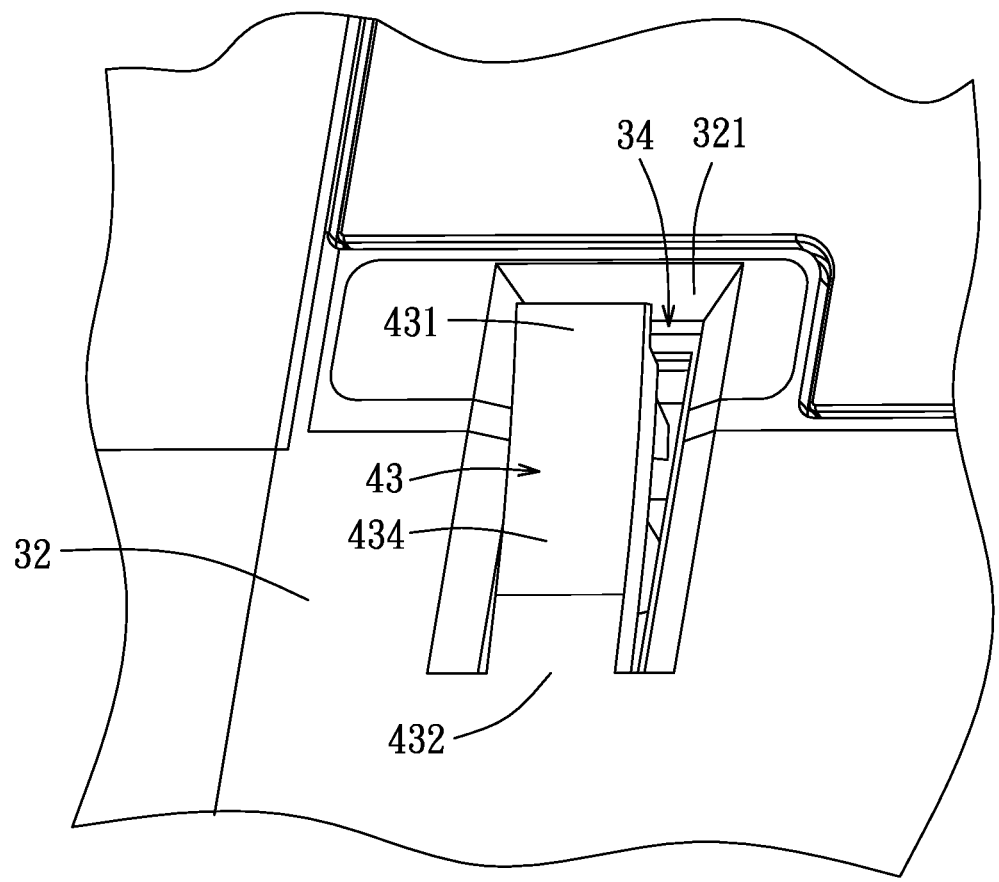
FIG. 6 is another enlarged fragmentary perspective view of the fastening mechanism of the embodiment, illustrating a cantilever being bent.

Referring to FIGS. 4, 5 and 6, the housing 3 further has a pair of U-shaped separate grooves 34 formed in the second panel 32. Each of the separate grooves 34 is formed around the free end segment 431 of a respective one of the cantilevers 43. The housing 3 further has two cover members 35 extending respectively toward the fixing portions 41 from the second panel 32 and covering respectively the separate grooves 34, so that the inside of the housing 3 cannot be seen directly from outside of the housing 3, and that electrostatic discharge can be prevented. In addition, the second panel 32 further has two inclined surfaces 321 (see FIG. 6) that are formed on one side of the second panel 32 opposite to the cover members 35, and that are adjacent respectively to the separate grooves 34.

The disassembling and assembling processes of this embodiment are described in the following with reference to FIGS. 7, 8, 9 and 10. When it is desired to disassemble the battery module 2 from the housing 3, the free end segment 431 of each of the cantilevers 43 is bent away from a corresponding one of the fixing portions 41, so as to detach each of the second fastening portions 44 from a corresponding one of the first fastening portions 42, and to drive the protrusion 45 to be inclined toward and to abut against the fixing portion 41, thereby urging the fixing portion 41 to move from an engaged position (see FIG. 9) to a disengaged position (see FIG. 10) for completing the disassembling operation. Referring to FIG. 6, the configuration of the relatively thin free end segment 431 of the cantilever 43 and the presence of the inclined surfaces 321 facilitates the bending of the cantilever 43.

Figure 7:
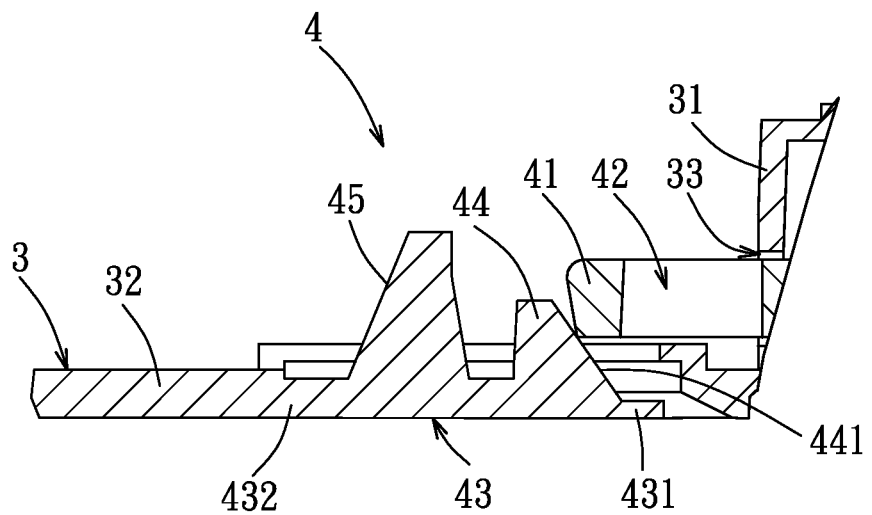
FIG. 7 is a sectional view of the fastening mechanism of the embodiment, illustrating that a fixing portion is in contact with a second fastening portion during movement of the fixing portion from a disengaged position toward an engaged position.
Figure 8:
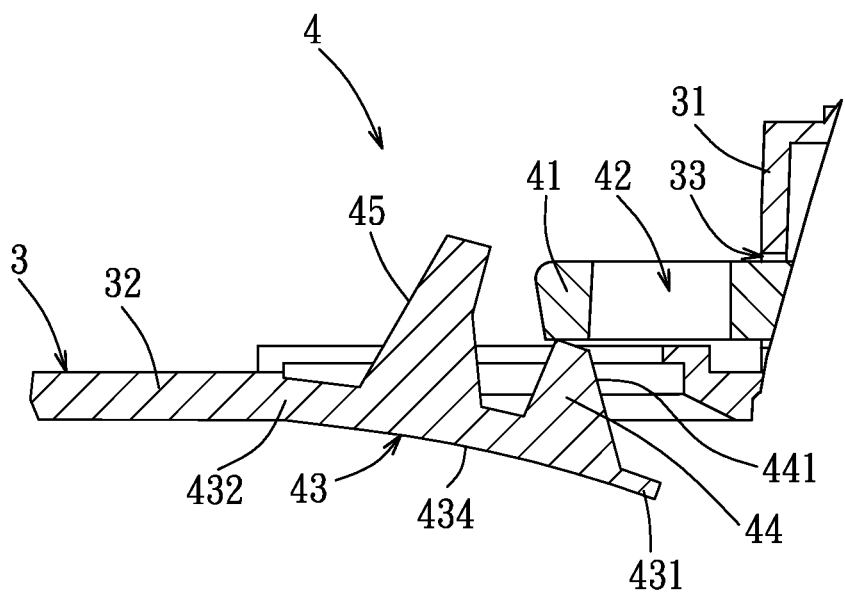
FIG. 8 is another sectional view of the fastening mechanism of the embodiment, illustrating that the cantilever is bent away from the fixing portion during the movement of the fixing portion from the disengaged position toward the engaged position.

As shown in FIG. 7, during the assembling of the battery module 2 to the housing 3, each of the fixing portions 41 is inserted from the disengaged position into the corresponding one of the openings 33, and is in contact with a corresponding one of the guiding surfaces 441 of the second fastening portions 44. Since the guiding surfaces 441 of the second fastening portions 44 are inclined, when the fixing portions 41 are further advanced, the fixing portions 41 bend the free end segment 431 of the corresponding one of the cantilevers 43 away from the fixing portion 41, and each of the fixing portions 41 moves across a top end of the corresponding one of the second fastening portions 44 as illustrated in FIG. 8. When the fixing portions 41 are moved to the engaged position, the coupling surface 21 of the battery module 2 abuts against the first panel 31 of the housing 3, the end of the fixing portions 41 are adjacent respectively to the protrusions 45, and the free end segments 431 of the cantilevers 43 restore to engage respectively the second fastening portions 44 with the first fastening portions 42 (see FIG. 9) for completing the assembling process.

To sum up, by virtue of the fastening mechanisms 4, the battery module 2 is easy to be assembled to and disassembled from the housing 3 without the use of additional parts.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic device comprising:
a battery module having a coupling surface;
a housing having a first panel that is parallel to said coupling surface and that is formed with at least one opening, and a second panel that extends inwardly and perpendicularly from said first panel; and
at least one fastening mechanism having
a fixing portion that extends from said coupling surface of said battery module and that engages removably said at least one opening,
a first fastening portion that is disposed on said fixing portion,
a cantilever that is flexible, that is formed in said second panel, and that has a free end segment proximate to said first panel, a fixed end segment distal from said first panel, a first surface adjacent to said fixing portion, and a second surface opposite to said first surface,
a second fastening portion disposed on said first surface, adjacent to said free end segment, and engaging removably said first fastening portion, and
a protrusion formed on said first surface and adjacent to said fixed end segment;
wherein said free end segment of said cantilever is urged by said fixing portion to bend away from said fixing portion during movement of said fixing portion from a disengaged position toward a engaged position via said at least one opening, and restores to engage said second fastening portion with said first fastening portion when said fixing portion is moved to the engaged position; and wherein said free end segment of said cantilever is operable to bend away from said fixing portion, such that said second fastening portion is disengaged from said first fastening portion, and that said fixing portion is urged by said protrusion to move from the engaged position to the disengaged position to be disengaged from said at least one opening.

2. The electronic device as claimed in claim 1, wherein said protrusion has an abutment surface facing said second fastening portion, and abutting against said fixing portion when said fixing portion moves from the engaged position to the disengaged position.

3. The electronic device as claimed in claim 1, wherein said first fastening portion is a through hole extending through said fixing portion.

4. The electronic device as claimed in claim 3, wherein said second fastening portion is a projection having an inclined guiding surface that faces said at least one opening, said fixing portion pushing said guiding surface to bend said free end segment of said cantilever during the movement of said fixing portion from the disengaged position toward the engaged position via the at least one opening.

5. The electronic device as claimed in claim 4, wherein said housing further has a U-shaped separate groove formed in said second panel around said free end segment of said cantilever.

6. The electronic device as claimed in claim 5, wherein said housing further has a cover member extending from said second panel toward said fixing portion and covering said separate groove.

7. The electronic device as claimed in claim 1, wherein said second fastening portion has an inclined guiding surface facing said at least one opening, said fixing portion pushing said guiding surface to bend said free end segment of said cantilever during the movement of said fixing portion from the disengaged position toward the engaged position via the at least one opening.

8. The electronic device as claimed in claim 7, wherein said housing further has a U-shaped separate groove formed in said second panel around said free end segment of said cantilever.

9. The electronic device claim 8, wherein said housing further has a cover member extending from said second panel toward said fixing portion and covering said separate groove.

10. The electronic device as claimed in claim 1, wherein said housing further has a U-shaped separate groove formed in said second panel around said free end segment of said cantilever.

11. The electronic device as claimed in claim 10, wherein said housing further has a cover member extending from said second panel toward said fixing portion and covering said separate groove.

* * * * *